(12) United States Patent
Nagashima et al.

(10) Patent No.: US 9,796,252 B2
(45) Date of Patent: Oct. 24, 2017

(54) RESTRICTING DEVICE

(71) Applicant: AISIN SEIKI KABUSHISIKI KAISHA, Kariya-shi, Aichi-ken (JP)

(72) Inventors: Yoji Nagashima, Kariya (JP); Yoshitaka Ide, Anjo (JP); Kazushige Kawamura, Kariya (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 15/337,003

(22) Filed: Oct. 28, 2016

(65) Prior Publication Data

US 2017/0122021 A1   May 4, 2017

(30) Foreign Application Priority Data

Oct. 29, 2015   (JP) ................. 2015-213461

(51) Int. Cl.
| | |
|---|---|
| *B60J 7/185* | (2006.01) |
| *B60J 7/043* | (2006.01) |
| *E05F 5/00* | (2017.01) |
| *E05F 5/06* | (2006.01) |
| *B60J 7/02* | (2006.01) |

(52) U.S. Cl.
CPC .............. *B60J 7/1856* (2013.01); *B60J 7/024* (2013.01); *B60J 7/0435* (2013.01); *E05F 5/003* (2013.01); *E05F 5/06* (2013.01)

(58) Field of Classification Search
CPC .................................................. B60J 7/1856
USPC ................................................. 296/223, 224
See application file for complete search history.

(56) References Cited

U.S. PATENT DOCUMENTS 8,459,730 B2   6/2013   Sawada et al.

FOREIGN PATENT DOCUMENTS

| EP | 2 700 521 A2 | 2/2014 |
|---|---|---|
| JP | 2012-153336 | 8/2012 |
| JP | 2014-69615 | 4/2014 |

OTHER PUBLICATIONS

Search Report issued in European patent application No. 16195828.5 dated Apr. 10, 2017.

*Primary Examiner* — Dennis H Pedder
(74) *Attorney, Agent, or Firm* — Finnegan, Henderson, Farabow, Garrett & Dunner, LLP

(57) ABSTRACT

A restricting device includes: a movable member that is capable of changing a posture with respect to a support member; and a buffer member that is fixed to the movable member, comes into contact with the support member in accordance with a posture change of the movable member, and restricts the posture of the movable member, wherein in the movable member, a mounting recess portion, an outlet port, a slip-off preventing piece, and a fitting piece are formed, and the buffer member has a fixing portion, an elastic portion, and a connecting portion, and in the elastic portion, a fitting recess portion is fitted is formed.

2 Claims, 4 Drawing Sheets

RESTRICTING DEVICE

CROSS REFERENCE TO RELATED APPLICATIONS

This application is based on and claims priority under 35 U.S.C. §119 to Japanese Patent Application 2015-213461, filed on Oct. 29, 2015, the entire contents of which are incorporated herein by reference.

TECHNICAL FIELD

This disclosure relates to a restricting device.

BACKGROUND DISCUSSION

In the related art, as a restricting device, for example, a vehicle deflector device described in JP 2014-69615A (FIG. 5) (hereinafter, referred to as Reference 1) is known. An arm portion (wind-shielding end portion) of a deflector included in this vehicle deflector device has a restricting portion that is formed in a hole portion penetrating a center portion in a vertical direction and a buffer member (buffer portion) fitted to the hole portion. Thus, in an unfolded state of the deflector, the buffer member comes into contact with a lower protrusion portion provided in an opening edge of a roof opening portion. That is, the buffer member comes into contact with the lower protrusion portion and thereby a posture change of the deflector is restricted in the unfolded state. In this case, the buffer member is made of rubber and thereby it is assumed that an impact sound during the contact is suppressed.

However, in Reference 1, in order to prevent slip-off of the buffer member which is in the state of being fitted to the hole portion, a diameter of a tip portion of the buffer member penetrating the hole portion is enlarged substantially in an umbrella shape, and a latching margin is ensured between a peripheral edge portion of the hole portion and the tip portion of the buffer member. Therefore, it is necessary to reduce the diameter of the tip portion when fitting the buffer member to the hole portion during assembling the buffer member. Usually, it is difficult to press-fit the umbrella-shaped tip portion of the buffer member into the hole portion and it is necessary to pull the tip portion from a side opposite to the hole portion. Specifically, in formation of a protrusion in advance for pulling the tip portion of the buffer member, an operation, in which the tip portion is made to penetrate into the hole portion by pulling the protrusion and the protrusion is removed after fitting, is performed. Therefore, it is inevitable that the number of assembling man-hours for the buffer member will increase.

SUMMARY

Thus, a need exists for a restricting device which is not suspectable to the drawback mentioned above.

A restricting device according to an aspect of this disclosure includes a movable member that is capable of changing a posture with respect to a support member; and a buffer member that is fixed to the movable member, comes into contact with the support member in accordance with a posture change of the movable member, and restricts the posture of the movable member. In the movable member, a mounting recess portion that is open in a first direction that is one direction different from a direction of the posture change, an outlet port through which the mounting recess portion opens in a second direction that is one direction of the posture change, a slip-off preventing piece that protrudes in an opening end of the mounting recess portion in a direction intersecting the first direction, and a fitting piece that protrudes in the second direction are formed. The buffer member has a fixing portion that is flitted into the mounting recess portion, an elastic portion that protrudes from the movable member in the second direction and is capable of coming into contact with the support member, and a connecting portion that connects between the fixing portion and the elastic portion through the outlet port, and in the elastic portion, a fitting recess portion into which the fitting piece that is recessed in the second direction is fitted is formed.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an embodiment of a restricting device will be described. Moreover, in the following description, a forward and rearward direction of a vehicle is referred to as "forward and rearward direction" and upward and downward of a height direction of the vehicle are respectively referred to as "upward" and "downward". In addition, an inside of the vehicle in a width direction toward a passenger compartment side is referred to as "vehicle inside" and an outside of the vehicle in the width direction outward the passenger compartment side is referred to as "vehicle outside".

Figure 1:
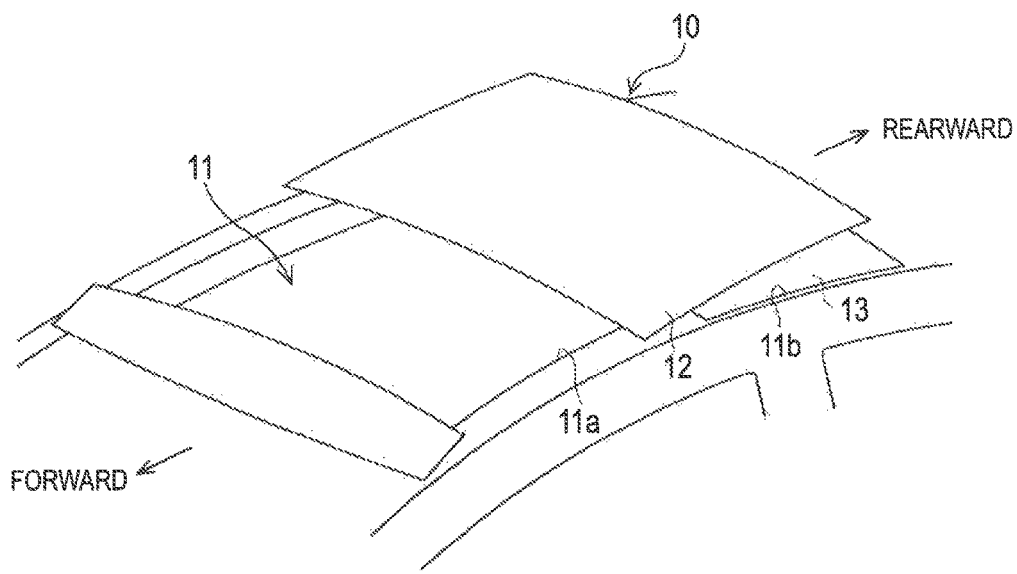
FIG. 1 is a perspective view of a roof to which an embodiment of a restricting device is applied.

As illustrated in FIG. 1, in a roof 10 of the vehicle such as an automobile, a substantially rectangular opening 11 is formed and substantially rectangular movable panel 12 and fixed panel 13 formed of a plate material made by, for example, glass or resin are provided. The movable panel 12 is mounted on a front side opening 11a of the opening 11 to be capable of opening and closing. That is, the movable panel 12 is mounted to be capable of performing a tilt-up operation in which a rear side portion rises about a front side portion as a pivot point and a sliding operation in the forward and rearward direction. In opening and closing operations of the front side opening 11a by the movable panel 12, a so-called outer sliding type, in which the movable panel 12 performs the sliding operation while being in a tilt-up state, is employed. Meanwhile, the fixed panel 13 is mounted so as to always close a rear side opening 11b of the opening 11.

Next, a structure regarding the opening and closing operations of the movable panel 12 and the like will be described.

Figure 2:
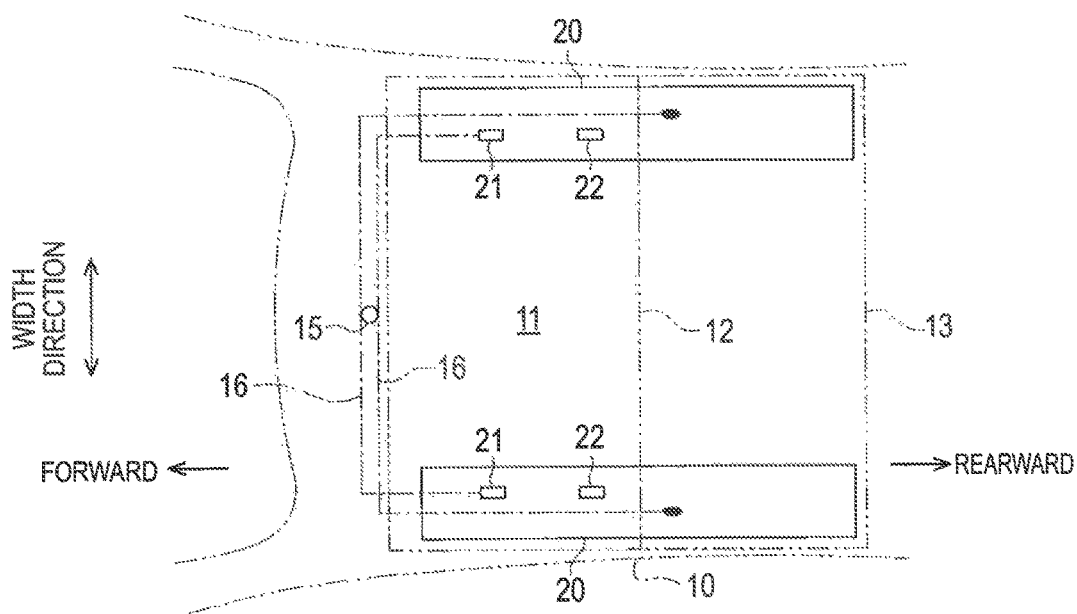
FIG. 2 is a plan view of the roof to which the embodiment of the restricting device is applied.

As illustrated in FIG. 2, guide rails 20 are disposed and fixed in both edge portions of the opening 11 in the width direction of the vehicle as a pair of support members. Each guide rail 20 is made of, for example, an extruded material of aluminum alloy and extends in the forward and rearward direction having a constant cross-section in a longitudinal direction. Thus, each guide rail 20 movably guides and supports a driving shoe 21 in the forward and rearward direction.

In addition, an electric drive source 15 such as an electric motor having, for example, an output gear is provided in a front edge portion of the opening 11. The electric drive source 15 is connected to each driving shoe 21 via each of a pair of substantially strip-shaped driving belts 16 made of, for example, a resin material and moves both the driving shoes 21 simultaneously in the forward and rearward direction.

Moreover, each guide rail 20 movably guides and supports a rear side guide member 22 in the forward and rearward direction. The rear side guide members 22 is provided to be capable of engaging and disengaging from the driving shoes 21 and is associated with the movable panel 12. Thus, for example, in a fully-closed state of the movable panel 12, if the rear side guide members 22 are moved forward from an initial position relative to the movable panel 12 together with the driving shoes 21, the movable panel 12 performs the tilt-up operation. In addition, after the tilt-up operation is completed in accordance with the movements of the driving shoes 21 and the like forward, if the driving shoes 21 and the like are moved rearward, the movable panel 12 is integrally moved rearward and performs an opening operation while being in the tilt-up state. Thus, if the rear side guide members 22 moving rearward together with the driving shoes 21 reach a restricting position rearward from the initial position, the rear side guide members 22 are disengaged from the driving shoes 21. Therefore, if the driving shoes 21 are moved further rearward, the movable panel 12 is moved further rearward while leaving the rear side guide members 22 and performs the opening operation until being in a fully-open state while being in the tilt-up state. In this case, a support position of the movable panel 12 is maintained by the rear side guide members 22 until at least the rear side guide members 22 reach the restricting position and thereby support rigidity of the movable panel 12 is ensured even in the fully-open state.

Next, a structure regarding engaging and disengaging of the driving shoes 21 and the rear side guide members 22 will be described.

Figure 3A:
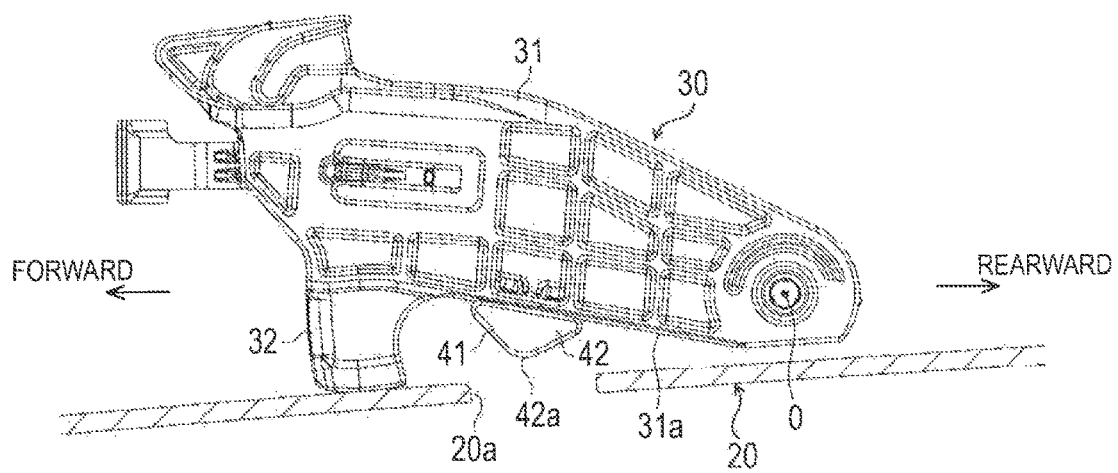
FIGS. 3A and 3B are side views of a structure of the restricting device of the embodiment viewed from a vehicle inside in a width direction.
Figure 3B:
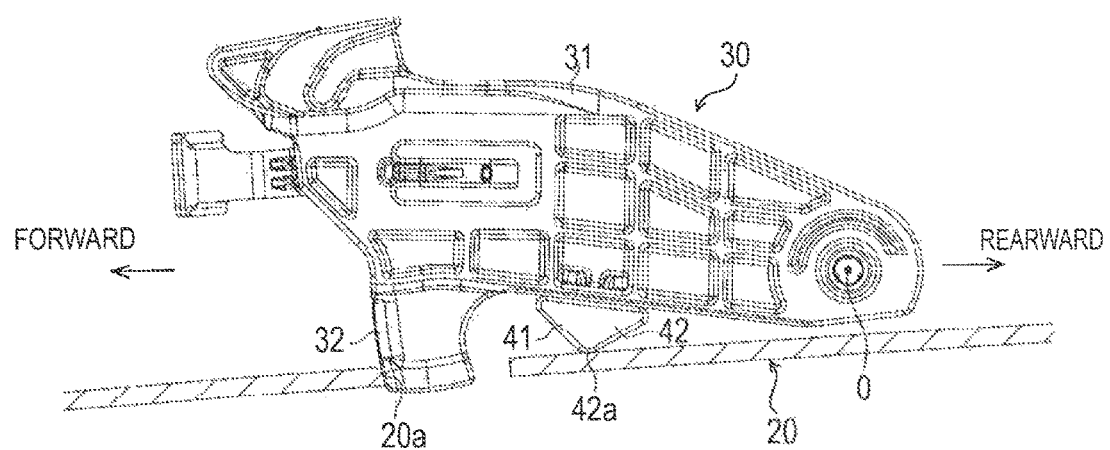
Figure 4:
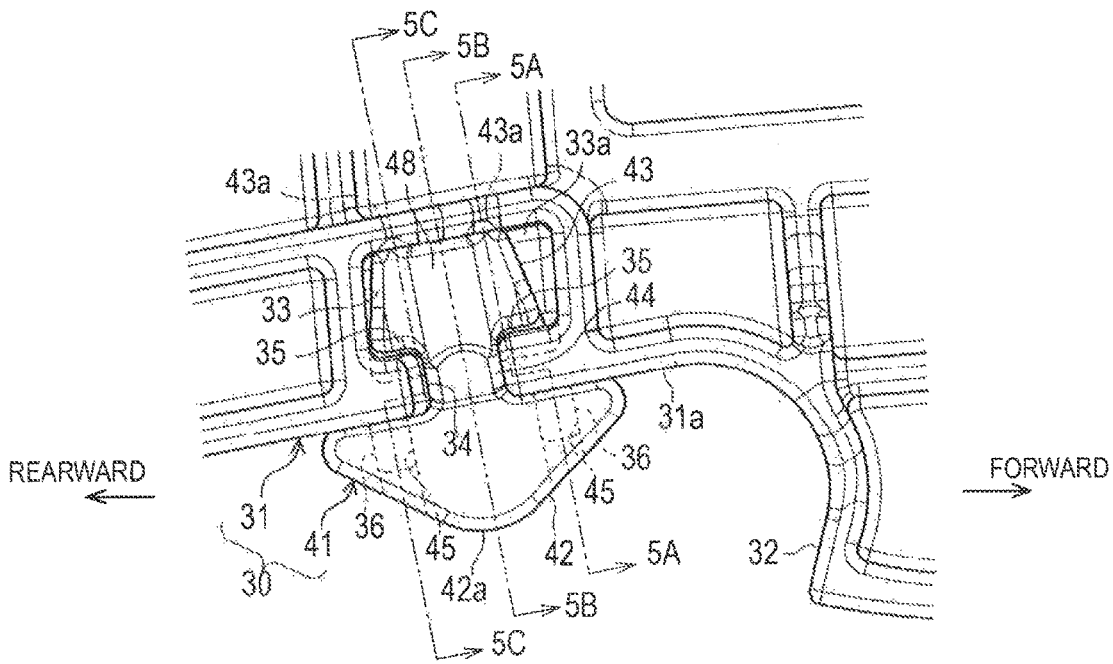
FIG. 4 is a side view of the structure of the restricting device of the embodiment viewed from a vehicle outside in the width direction.
Figure 5A:
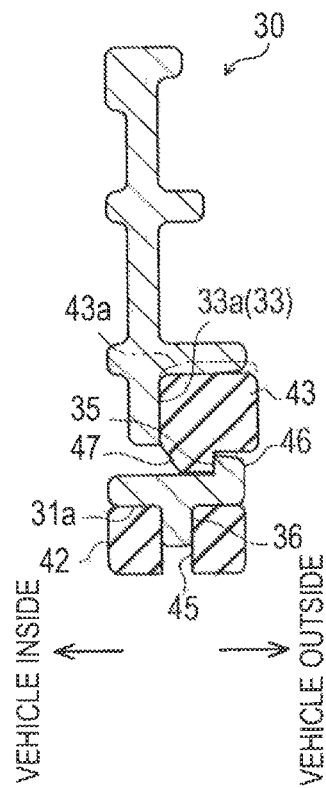
FIGS. 5A to 5C are sectional views that are respectively taken along line 5A-5A, line 50-5C, and line 5B-5B of FIG. 4.
Figure 5B:
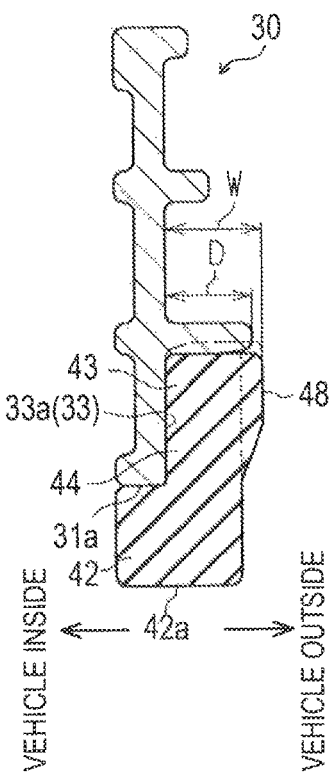
Figure 5C:
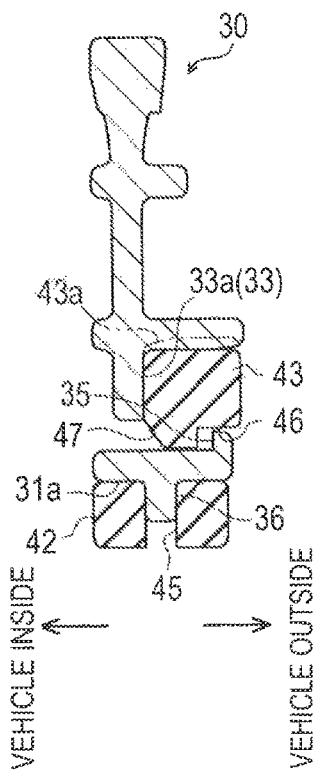

As illustrated in FIGS. 3A and 3B, each guide rail 20 supports a check device 30. The check device 30 has a check member 31 as a movable member that is rotatably connected to the rear side guide member 22 around an axis O extending in the width direction of the vehicle (direction orthogonal to a paper surface) and a buffer member 41 that is fixed to the check member 31.

The check member 31 is made of, for example, a resin material, is formed substantially in a plate shape standing in a height direction of the vehicle, and moves integrally with the rear side guide member 22 in the forward and rearward direction. In a front end portion of the check member 31, a substantially rectangular restricting portion 32 protrudes downward from a lower end thereof. The buffer member 41 is made of, for example, a buffer material such as rubber and has a substantially isosceles triangle pillar-shaped elastic portion 42 protruding downward from the lower end of the check member 31 on a rear side of the restricting portion 32. A tip portion of the elastic portion 42 facing the guide rail 20 has a sharp point portion 42a.

Moreover, the check member 31 is biased in a counterclockwise direction, that is, as illustrated in FIG. 3A, in a rotating direction in which the restricting portion 32 abuts against the guide rail 20 by an appropriate biasing member (for example, a coil spring (not illustrated)). In this case, the elastic portion 42 is positioned above the guide rail 20 and is in a non-contact state with the guide rail 20. Meanwhile, a restricting hole 20a, which is open rearward the vehicle from the restricting portion 32 in the height direction, is formed in the guide rail 20. As illustrated in FIG. 3B, the check member 31 rotates the restricting portion 32 reaching the restricting hole 20a in the counterclockwise direction while fitting thereto. In this case, the elastic portion 42 comes into contact with the guide rail 20 rearward the restricting hole 20a thereby restricting the rotation of the check member 31. That is, the elastic portion 42 restricts the posture of the check member 31 against the guide rail 20 when the restricting portion 32 is fitted into the restricting hole 20a.

Here, the check member 31 is engaged with the driving shoe 21 so as to be integrally moved when the check member 31 is in a posture illustrated in FIG. 3A and is disengaged from the driving shoe 21 so as to allow the movement of the driving shoe 21 rearward when the check member 31 is in a posture illustrated in FIG. 3B. That is, the rear side guide member 22 is provided to be capable of engaging with and disengaging from the driving shoe 21 via the check member 31 (check device 30). Of course, the position of the rear side guide member 22 coincides with the restricting position when the check member 31 is in the posture illustrated in FIG. 3B.

Next, a fixing structure of the check member 31 and the buffer member 41 will be described. Moreover, a pair of check devices 30 disposed in both the guide rails 20 are equal to each other in shapes except that the check devices 30 are symmetrical (bilateral symmetry) in the width direction of the vehicle. Therefore, in the following description, basically, one check device 30 (right side toward the front of the vehicle) will be described as a representative.

As illustrated in FIGS. 4 and 5A to 5C, the check member 31 has a substantially flat-shaped lower surface 31a extending rearward from the restricting portion 32. Thus, a substantially rectangular mounting recess portion 33 opening to the vehicle outside (first direction that is one direction different from a direction of a posture change of the check member 31) and a substantially U-shaped recessed outlet port 34 through which the mounting recess portion 33 opens downward (second direction that is one direction of the posture change) are formed in the check member 31. Moreover, the direction of the posture change of the check member 31 strictly coincides with a circumferential direction about the axis O, but a rotational amount is slight in accordance with the posture change of the check member 31, and thereby it is regarded as equivalent to a substantially tangential direction.

Figure 6:
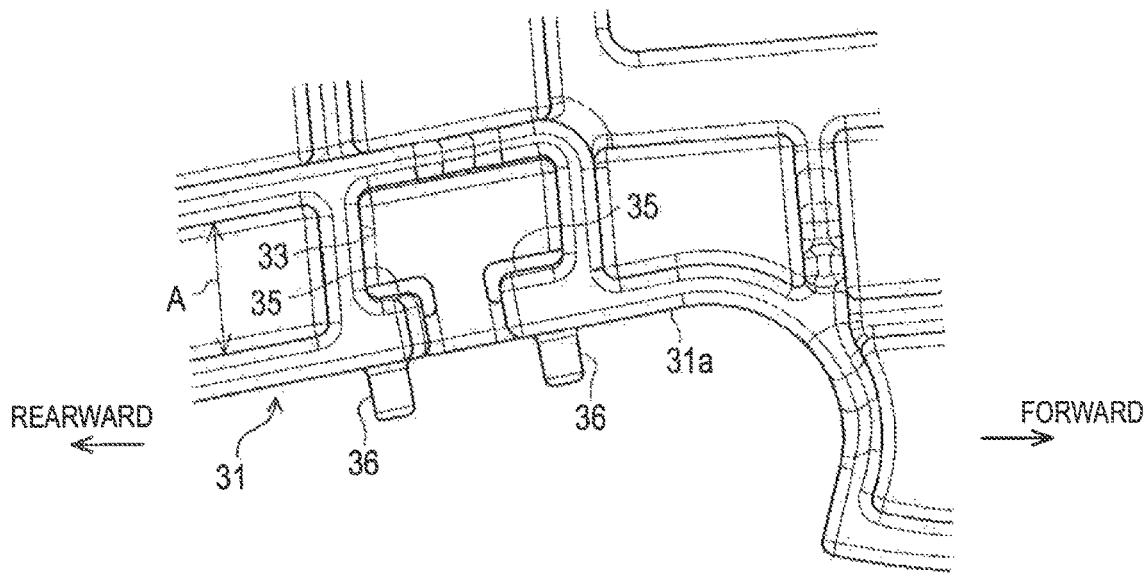
FIG. 6 is a side view of a check member viewed from the vehicle outside in the width direction.

In addition, a pair of substantially flange-shaped slip-off preventing pieces 35, which protrude upward (direction intersecting the first direction to the opening end of the mounting recess portion 33) to a vehicle outside end of a lower side inner wall surface of the mounting recess portion 33, are formed forward and rearward the outlet port 34 in the check member 31. Furthermore, as also illustrated in FIG. 6, a pair of substantially flange-shaped fitting pieces 36, which protrude downward (second direction) from a center portion of the lower surface 31a in the width direction of the vehicle, are formed forward and rearward the outlet port 34 in the check member 31.

Meanwhile, the buffer member 41 has a substantially isosceles trapezoid pillar-shaped fixing portion 43 that is fitted into the mounting recess portion 33 and a connecting portion 44 that connects between the fixing portion 43 and the elastic portion 42 through the outlet port 34. It is also described above already that the elastic portion 42 protruding downward (second direction) from the check member 31 is capable of coming into contact with the guide rail 20. Thus, fitting holes 45 as a pair of fitting recess portions into which the fitting pieces 36 are fitted by penetrating (recessed in the second direction) in the upward and downward direction along an extending direction of both the fitting pieces 36 are formed in the elastic portion 42.

In addition, a pair of substantially rectangular notches 46 are formed forward and rearward the connecting portion 44 (outlet port 34) at corner portions of a vehicle outside lower side of the fixing portion 43. Both the slip-off preventing pieces 35 of the check member 31 enter both the notches 46 and thereby the fixing portion 43 fitted into the mounting recess portion 33 is restricted in motion on the vehicle outside. Of course, the fixing portion 43 is restricted in motion on the vehicle inside by abutting against the bottom surface (inner wall surface on the vehicle inside) 33a of the mounting recess portion 33.

Furthermore, a pair of guide surfaces 47 are formed forward and rearward the connecting portion 44 (outlet port 34) at the corner portions of the vehicle inside lower portion of the fixing portion 43. Each guide surface 47 is inclined upward as being directed to the vehicle inside. In addition, a substantially semicylindrical raised portion 48 protrudes on the vehicle outside in a position of the connecting portion 44 in the forward and rearward direction in the fixing portion 43. The raised portion 48 extends in the height direction of the vehicle over a substantially entire length of the fixing portion 43. A dimension (dimension in the first direction in at least a part of the fixing portion 43) W of the fixing portion 43 in the width direction of the vehicle in the raised portion 48 is set greater than a recessed amount D of the mounting recess portion 33.

Figure 7A:
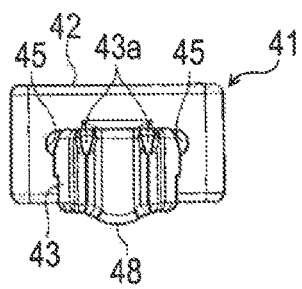
FIGS. 7A to 7C are respectively a plan view, a side view viewed from the vehicle outside in the width direction, and a bottom view of a buffer member.
Figure 7B:
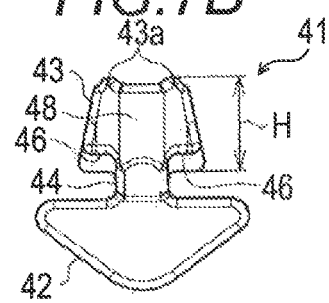
Figure 7C:
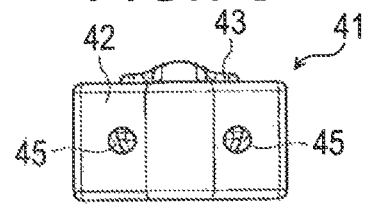

Furthermore, as also illustrated in FIGS. 7A to 7C, a pair of substantially semicylindrical ribs 43a protrude forward and rearward the raised portion 48 in the fixing portion 43. A dimension H of the fixing portion 43 in the height direction (at least one direction) of the vehicle in the position of the rib 43a in a free state is set greater than an opening width A of the mounting recess portion 33 in the same direction. In addition, a dimension of the fixing portion 43 in the height direction of the vehicle in positions other than the rib 43a in the free state is set substantially equal to or slightly less than the opening width A of the mounting recess portion 33 in the same direction. Therefore, both the ribs 43a are fitted into the mounting recess portion 33 in a compressed stated, in the fixing portion 43.

Moreover, as described above, the pair of check devices 30 disposed in both the guide rails 20 are symmetrical to each other in the width direction of the vehicle. Therefore, both the check members 31 and both the buffer members 41 are symmetrical to each other in the width direction of the vehicle (first direction and a direction opposite thereto). However, both the buffer members 41 have the same shape each other and are symmetrical to each other in the width direction of the vehicle by reversing one side of both the buffer members 41 in the forward and rearward direction (direction orthogonal to the first direction and the second direction).

As described above in detail, in the embodiment, it is possible to achieve the following advantages.

(1) In the embodiment, in the assembling step, when the buffer member 41 is fixed to the check member 31, first, the fixing portion 43 is fitted into the mounting recess portion 33 by moving the fixing portion 43 on the vehicle inside (direction opposite to the first direction) in a state where the connecting portion 44 is laid along the outlet port 34. In this case, the fixing portion 43 is pinched between the bottom surface 33a of the mounting recess portion 33 and the slip-off preventing piece 35 by riding over the slip-off preventing piece 35 while being guided on the guide surface 47. Therefore, falling out of the fixing portion 43 on the vehicle outside is suppressed. Subsequently, both the fitting pieces 36 are fitted into both the fitting holes 45 while the elastic portion 42 is elastically deformed together with the connecting portion 44. Therefore, the position of the elastic portion 42 in the width direction of the vehicle is restricted. In this case, in the peripheral edge portion of the both ends of the outlet port 34, the check member 31 is pinched between the fixing portion 43 and the elastic portion 42. Therefore, the buffer member 41 is restricted in motion in the width direction of the vehicle (first direction and a direction opposite thereto) with respect to the check member 31, and is restricted in motion in the height direction (second direction and a direction opposite thereto) of the vehicle. In this case, since the buffer member 41 may be essentially assembled to the check member 31 toward the vehicle inside (direction opposite to the first direction), it is possible to further reduce the number of assembling man-hours. In other words, unlike the related art, in formation of the protrusion in advance for pulling the tip portion (elastic portion 42) of the buffer member, an operation, in which the tip portion is penetrated into the hole portion (outlet port 34) by pulling the protrusion and the protrusion is removed after fitting, may not be performed.

(2) In the embodiment, the buffer member 41 is restricted in motion in the width direction of the vehicle with respect to the check member 31 as described above and is restricted in motion in the height direction of the vehicle. Simultaneously, the fixing portion 43 is fitted into the mounting recess portion 33 or the connecting portion 44 passes through the outlet port 34, and thereby the buffer member 41 is restricted in motion in the forward and rearward direction with respect to the check member 31. Therefore, the buffer member 41 is prevented from being misaligned or from coming off from the check member 31. It is possible to further stabilize the posture of the check member 31, for example, when the buffer member 41 comes into contact with the guide rail 20.

(3) In the embodiment, the dimension H of the fixing portion 43 in the height direction of the vehicle in positions of the rib 43a in the free state is set greater than the opening width A of the mounting recess portion 33 in the same direction. Therefore, it is possible to further stably fix the buffer member 41 by the check member 31 by fitting (so-called wrap shape) the fixing portion 43 into the mounting recess portion 33 in a compressed state.

(4) In the embodiment, the tip portion of the elastic portion 42 facing the guide rail 20 has the sharp point portion 42a. Therefore, the buffer member 41 (elastic portion 42) comes into contact (collision) with the guide rail 20 at the sharp point portion 42a in a point contact or a line contact in accordance with the posture change of the check member 31. Therefore, the elastic portion 42 is further easily deflected, for example, compared to a case of a surface contact. Therefore, a time in which a force (impact force) acting during the contact is operated becomes longer, accordingly, it is possible to reduce the impact force and further reduce an impact sound.

(5) In the embodiment, the dimension W of the fixing portion 43 in the width direction of the vehicle in the raised portion 48 is set greater than the recessed amount D of the mounting recess portion 33. Therefore, the fixing portion 43 fitted into the mounting recess portion 33 protrudes from the mounting recess portion 33 in the raised portion 48 on the vehicle outside. Therefore, in the assembling step, when fixing the buffer member 41 to the check member 31, it is possible to fit the fixing portion 43 into the mounting recess portion 33 to a back thereof without interfering with the check member 31 (peripheral edge portion of the mounting recess portion 33).

(6) In the embodiment, both the buffer members 41 have the same shape each other, that is, it is possible to share the buffer member 41 on both sides in the width direction of the vehicle and also to share a mold for molding. Therefore, it is possible to further reduce manufacturing man-hours.

(7) In the embodiment, the buffer member 41 is separately provided in the check member 31 and the material thereof is a buffer material such as rubber. Therefore, it is possible to sufficiently reduce the impact sound generated during coming into contact (collision) with the guide rail 20. In addition, the impact sound is naturally eliminated and it is possible to reduce feeling of insecurity given to an occupant.

(8) In the embodiment, an assembling direction (vehicle inside) of the buffer member 41 with respect to the check member 31 and a loading direction (upward) which is given to the buffer member 41 coming into contact (collision) with the guide rail 20 in accordance with the posture change of the check member 31 are orthogonal to each other. Therefore, it is possible to reduce possibility that the buffer member 41 is misaligned or is coming off from the check member 31 due to the force (impact force) acting during the contact.

Moreover, the embodiment described above may be changed as follows.

In the embodiment, if both the buffer members 41 are symmetrical (bilateral symmetry) to each other in the width direction of the vehicle, both the buffer members 41 may have shapes different from each other.

In the embodiment, both the check member 31 may not be symmetrical (bilateral symmetry) to each other in the width direction of the vehicle. Similarly, both the buffer members 41 may not be symmetrical (bilateral symmetry) to each other in the width direction of the vehicle.

In the embodiment, the raised portion 48 of the buffer member 41 may be omitted. That is, the fixing portion 43 fitted into the mounting recess portion 33 may not protrude from the mounting recess portion 33 on the vehicle outside.

In the embodiment, the sharp point portion 42a of the elastic portion 42 may be omitted. That is, the buffer member 41 (elastic portion 42) may come into contact (collision) with the guide rail 20 in a surface contact in accordance with the posture change of the check member 31.

In the embodiment, the number and the arrangement of the ribs 43a of the fixing portion 43 may be arbitrary changed.

In the embodiment, the ribs 43a of the fixing portion 43 may be omitted. That is, fitting of the fixing portion 43 into the mounting recess portion 33 may be performed in a non-compressed state.

In the embodiment, the number and the arrangement of the fitting pieces 36 (fitting holes 45) may be arbitrary changed.

In the embodiment, a non-through hole-shaped fitting recess portion may be employed instead of the fitting hole 45.

In the embodiment, the direction of the posture change of the check member 31 coincides with the circumferential direction about the axis O, but, for example, the check member (31) may coincide with an appropriate linear line.

This disclosure can be applied to any device including, for example, the movable member performing the posture change such as a deflector device.

Next, technical ideas that can be grasped from the embodiment and the modification examples described above are appended as follows.

A restricting device according to an aspect of this disclosure includes a movable member that is capable of changing a posture with respect to a support member; and a buffer member that is fixed to the movable member, comes into contact with the support member in accordance with a posture change of the movable member, and restricts the posture of the movable member. In the movable member, a mounting recess portion that is open in a first direction that is one direction different from a direction of the posture change, an outlet port through which the mounting recess portion opens in a second direction that is one direction of the posture change, a slip-off preventing piece that protrudes in an opening end of the mounting recess portion in a direction intersecting the first direction, and a fitting piece that protrudes in the second direction are formed. The buffer member has a fixing portion that is fitted into the mounting recess portion, an elastic portion that protrudes from the movable member in the second direction and is capable of coming into contact with the support member, and a connecting portion that connects between the fixing portion and the elastic portion through the outlet port, and in the elastic portion, a fitting recess portion into which the fitting piece that is recessed in the second direction is fitted is formed.

According to this configuration, in an assembling step, when fixing the buffer member to the movable member, first, the fixing portion is fitted into the mounting recess portion by being moved in a direction opposite to the first direction in a state where the connecting portion is laid along the outlet port. In this case, the fixing portion is pinched between a bottom surface of the mounting recess portion and the slip-off preventing piece. Subsequently, the fitting piece is fitted into the fitting recess portion while the elastic portion is elastically deformed together with the connecting portion. In this case, the movable member is pinched between the fixing portion and the elastic portion. Therefore, the buffer member is restricted in motion in the first direction with respect to the movable member and a direction opposite thereto, and is restricted in motion in the second direction and a direction opposite thereto. In this case, since the buffer member may be essentially assembled to the movable member in a direction opposite to the first direction, it is possible to further reduce the number of assembling man-hours.

In the restricting device, it is preferable that a guide surface is formed at corner portions of a lower portion of the fixing portion.

With this configuration, in the assembling step, the fixing portion is pinched between the bottom surface of the mounting recess portion and the slip-off preventing piece by riding over the slip-off preventing piece while being guided on the guide surface.

In the restricting device, it is preferable that the dimension of the fixing portion at least in one direction in the free state is set greater than the opening width of the mounting recess portion in the same direction.

According to this configuration, it is possible to further stably fix the buffer member by the movable member by fitting the fixing portion into the mounting recess portion in a compressed state.

In the restricting device, the tip portion of the elastic portion facing the support member has the sharp point portion.

According to this configuration, the buffer member (elastic portion) comes into contact (collision) with the support member at the sharp point portion in the point contact or the line contact in accordance with the posture change of the movable member. Therefore, the elastic portion is further easily deflected, for example, compared to a case of the surface contact. Therefore, the time in which the force (impact force) acting during the contact is operated becomes longer, accordingly, it is possible to reduce the impact force and further reduce the impact sound.

In the restricting device, the dimension of at least a part of the fixing portion in the first direction is set greater than the recessed amount of the mounting recess portion.

According to this configuration, at least a part of the fixing portion fitted into the mounting recess portion protrudes from the mounting recess portion in the first direction. Therefore, in the assembling step, when fixing the movable member to the buffer member, it is possible to fit the fixing portion into the mounting recess portion to the back thereof without interfering with the movable member.

In the restricting device, a pair of the movable members are provided to be symmetrical to each other in the first direction and a direction opposite thereto, and a pair of the buffer members, which have the same shape each other and are symmetrical to each other in the first direction and the direction opposite thereto by reversing one of both the buffer members in a direction orthogonal to the first direction and the second direction, are provided.

According to this configuration, both the buffer members have the same shape each other, that is, it is possible to share the buffer member on both sides in the first direction and the direction opposite thereto and also to share the mold for molding. Therefore, it is possible to further reduce manufacturing man-hours.

The aspect of this disclosure has an advantage that assembling man-hours of the buffer member can be further reduced.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A restricting device comprising:
    a movable member that is capable of changing a posture with respect to a support member; and
    a buffer member that is fixed to the movable member, comes into contact with the support member in accordance with a posture change of the movable member, and restricts the posture of the movable member,
    wherein in the movable member, a mounting recess portion that is open in a first direction that is one direction different from a direction of the posture change, an outlet port through which the mounting recess portion opens in a second direction that is one direction of the posture change, a slip-off preventing piece that protrudes in an opening end of the mounting recess portion in a direction intersecting the first direction, and a fitting piece that protrudes in the second direction are formed, and
    the buffer member has a fixing portion that is fitted into the mounting recess portion, an elastic portion that protrudes from the movable member in the second direction and is capable of coming into contact with the support member, and a connecting portion that connects between the fixing portion and the elastic portion through the outlet port, and in the elastic portion, a fitting recess portion into which the fitting piece that is recessed in the second direction is fitted is formed.

2. The restricting device according to claim 1,
    wherein a guide surface is formed at corner portions of a lower portion of the fixing portion.

* * * * *